Francis Finnegan,
Inventor.
Koenig, Senniger, Powers and Leavitt,
Attorneys.

United States Patent Office 3,407,840
Patented Oct. 29, 1968

3,407,840
APPARATUS FOR CONTROLLING THE
LEVEL OF A LIQUID
Francis Finnegan, Brockton, Mass., assignor to Texas Instruments Incorporated, Dallas, Tex., a corporation of Delaware
Filed Nov. 29, 1965, Ser. No. 510,313
10 Claims. (Cl. 137—392)

ABSTRACT OF THE DISCLOSURE

The liquid level control disclosed herein may be constructed as a simple two-terminal device which can be connected in series with a valve across an A.C. power source to maintain a liquid at a preselected level. A silicon controlled rectifier is provided for controlling the flow of current to the valve. A voltage divider comprising an NTC thermistor and a serially connected load impedance is connected across the anode-cathode circuit of the SCR. The junction between the thermistor and its load impedance is connected to the gate of the SCR through a voltage breakdown device. When the valve is not energized, the voltage appearing across the anode-cathode circuit causes the thermistor to self-heat thereby reducing the voltage at the junction and preventing triggering of the SCR. However, when the thermistor is cooled by contact with the liquid, its lowered resistance causes the voltage at the junction between the thermistor and the load impedance to exceed the threshold of the breakdown device. The SCR is thus triggered to cause the valve to be operated. Accordingly, the valve is controlled to maintain the liquid substantially at the level of the thermistor.

This invention relates to apparatus for controlling the level within a vessel of a liquid having substantial cooling capacity and more particularly to such apparatus employing a self-heating thermistor for sensing the presence of the liquid at a preselected level.

Among the several objects of the invention may be noted the provision of apparatus which will control liquid level very precisely; the provision of such apparatus which includes no moving parts apart from valve means; the provision of such apparatus which comprises a simple two-terminal device which may be connected in series with valve means to be controlled; the provision of such apparatus which employs only solid state components; the provision of such apparatus which is highly reliable; and the provision of such apparatus which is simple and relatively inexpensive. Other objects and features will be in part apparent and in part pointed out hereinafter.

The invention accordingly comprises the apparatus hereinafter described, the scope of the invention being indicated in the following claims.

In the accompanying drawings, in which several of various possible embodiments of the invention are illustrated:

Corresponding reference characters indicate corresponding parts throughout the several views of the drawings.

Figure 1:
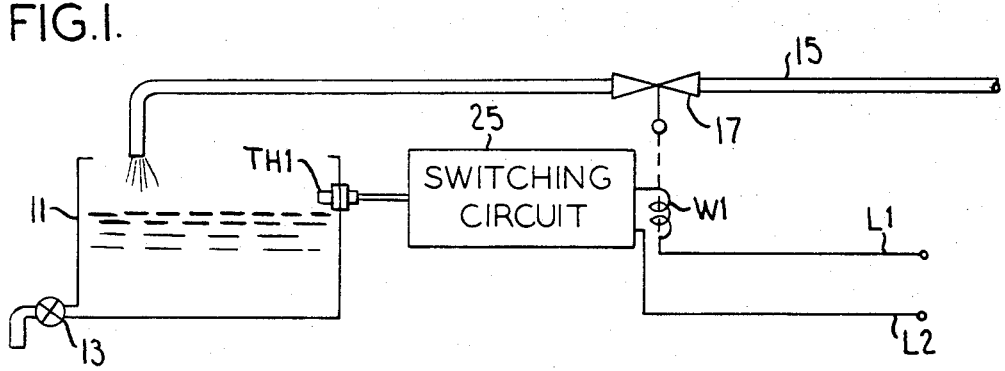
FIG. 1 is a diagrammatic illustration of apparatus according to the present invention for controlling the level of liquid within a vessel.

Referring now to FIG. 1, there is indicated at 11 a vessel or tank for containing a liquid. Liquid may be drawn off from tank 11 by means of valve 13. Liquid for replenishing the level within tank 11 is provided through a line 15 from a suitable supply (not shown). The flow of liquid into tank 11 is controlled by a conventional solenoid valve as indicated at 17. Valve 17 includes an actuating winding W1 which, when energized, opens the valve to admit liquid into tank 11.

An NTC thermistor TH1 is mounted on a side wall of tank 11 at the preselected level at which it is desired to maintain the level of liquid within the tank. A.C. electric power for heating thermistor TH1 and for energizing actuator winding W1 is obtained through a pair of supply leads L1 and L2 from a suitable source or conventional supply mains (not shown). Thermistor TH1 is connected to and controls a switching circuit indicated at 25 as described in greater detail hereinafter. Switching circuit 25 and actuator winding W1 are connected in series across lines L1 and L2.

Figure 2:
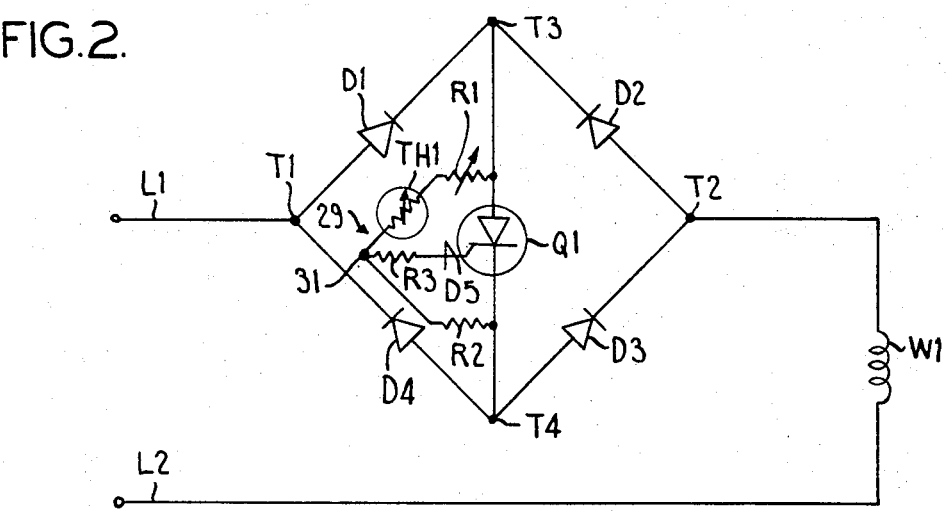
FIG. 2 is a schematic circuit diagram of the control apparatus of FIG. 1.

Switching circuit 25 and its interconnections with the various system components are illustrated in FIG. 2. Actuator winding W1 is connected across lines L1 and L2 in series with the A.C. input terminals T1 and T2 of a full-wave bridge rectifier constituted by four diodes D1–D4. Full-wave rectified power (pulsating D.C.) is provided at the remaining or output terminals T3 and T4 of the bridge.

The anode-cathode circuit of an SCR (silicon controlled rectifier) Q1 is connected across the pair of terminals T3 and T4 so as to constitute a switchable load for the bridge. When SCR Q1 conducts, the bridge will thus be effectively heavily loaded and will constitute a low A.C. impedance in series with actuator winding W1. When SCR Q1 is not conducting, however, the bridge will present an open circuit or high impedance in series with winding W1. As is apparent to those skilled in the art, the SCR Q1, when thus used in this bridge circuit, is effective to control the flow of A.C. power to winding W1. In one sense, the SCR is in series with winding W1 on both A.C. half cycles, the connections to the anode and cathode of the SCR being reversed after each half cycle by the diodes D1–D4 so that the voltage applied to the SCR is always in the forward direction.

Also connected across terminals T3 and T4, and in parallel with the anode-cathode circuit of SCR Q1, is a voltage divider 29. Divider 29 is constituted by thermistor TH1, a trimming resistor R1 and a load or reference impedance constituted by a resistor R2. The gate terminal of SCR Q1, which constitutes the control element of this triggerable semiconductor current switching device, is connected to voltage divider 29 at a junction 31 which is between thermistor TH1 and resistor R2 by a circuit which includes a four-layer voltage breakdown diode D5 and a current limiting resistor R3. Diode D5 is nonconducting at relatively low voltages but abruptly switches to a conductive state when the voltage at junction 31 exceeds a predetermined threshold level relative to the cathode of SCR Q1.

The operation of this apparatus is as follows: When power is applied to the leads L1 and L2 the SCR Q1 is not conducting, a pulsating D.C. voltage appears across the terminals T3 and T4. The current which is thereby caused to flow through voltage divider 29 causes thermistor TH1 to heat due to its internal heat generation due to $I^2R$ power loss. The heat dissipating capacity of thermistor TH1 is highly dependent upon whether or not it is contacted by the liquid within tank 11. When the liquid is in contact with the thermistor, the thermistor temperature will rise only slightly above the liquid temperature. The thermistor will thus exhibit a relatively high resistance and only a relatively small voltage will be present at the junction 31 relative to the cathode of SCR Q1. The breakdown threshold of diode D5 is therefore not exceeded and no triggering current is applied to the gate terminal of SCR Q1. The anode-cathode circuit of SCR Q1 thus remains nonconducting, no A.C. power is applied to the actuator winding W1, and the valve 17 thus remains closed.

If, however, the liquid level in tank 11 drops below thermistor TH1, the thermistor's heat dissipating capacity is severely reduced. The self-heating behavior of NTC thermistor TH1 is regenerative in nature, that is, the drop in resistance which accompanies a rise in temperature will cause an increased amount of heat to be generated within the thermistor itself. Thus, when the cooling effect of the liquid is removed, the thermistor temperature will rise to a relatively high level determined largely by the value of resistor R2 which limits the flow of current into the thermistor. This sharp rise in temperature produces a low value of resistance in NTC thermistor TH1 and a relatively high voltage at junction 31, which voltage causes a breakdown of diode D5. When diode D5 breaks down, current is applied to the gate terminal of SCR Q1 thereby triggering it into conduction. When SCR Q1 conducts, A.C. power is applied to actuator winding W1 through the rectifier bridge as explained previously. Energization of winding W1 opens valve 17 thereby admitting liquid into tank 11 to bring the liquid level back up into contact with thermistor TH1. When the liquid level reaches thermistor TH1, the thermistor is cooled thereby and conduction in SCR Q1 ceases so that the valve 17 is again closed, cutting off the flow of water into the tank.

In that voltage divider 29 need only handle the triggering current for SCR Q1, thermistor TH1 is constructed to possess a quite small thermal inertia and thus respond quickly to the presence or absence of liquid at its level. This apparatus thus maintains the liquid level very precisely at the preselected level of the thermistor.

It may be noted that the liquid level control apparatus according to the present invention employs no moving parts apart from the valve itself and is otherwise constituted entirely by solid state components. If desired the thermistor TH1 and the switching circuit 25 may be constructed as a unitary encapsulated assembly so as to constitute a two-terminal device which can be connected in series with the valve actuating winding W1 across an A.C. source of power. This unitary assembly is then mounted on the side of tank 11 with the thermistor TH1 being thermally exposed to the liquid within the tank at the preselected level at which the liquid level to to be maintained.

Figure 3:
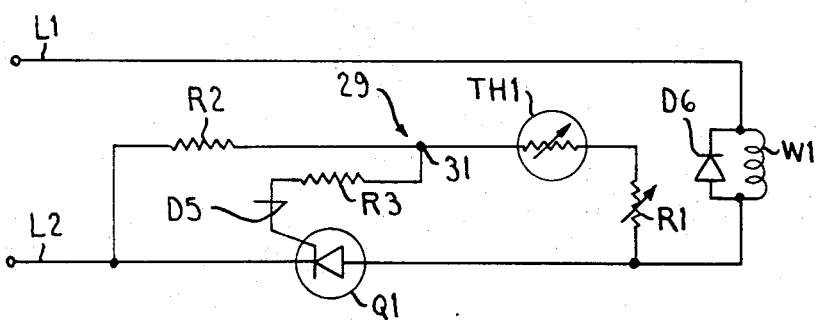
FIG. 3 is a schematic circuit diagram of another embodiment of liquid level control apparatus of the invention.

FIG. 3 illustrates an embodiment of the invention in which the full-wave rectifier bridge is omitted and the valve actuating winding W1 is operated on half-wave rectified current. In this embodiment the anode-cathode circuit of SCR Q1 is connected directly in series with winding W1. The voltage divider 29 is connected in parallel with the anode-cathode circuit of SCR Q1 as in the previous example. A diode D6 shunts winding W1. On the A.C. half cycles when SCR Q1 is forward biased, this control operates in essentially the same manner as the previous example. Thermistor TH1 self-heats and, when it is not cooled by the liquid, it triggers SCR Q1 to energive winding W1 thereby admitting liquid into the tank until the liquid level reaches the thermistor. On those half cycles when SCR Q1 is reverse biased, the switching circuit does not conduct current to winding W1 although current may continue to flow around the loop constituted by winding W1 and diode D6 due to the inductance of winding W1.

While a four-layer diode has been illustrated, other types of voltage breakdown devices, e.g., neon glow tubes and unijunction transistors, may also be used as understood by those skilled in the art. Similarly other forms of semiconductor current switching means may be used in place of the SCR shown in the drawings.

In view of the above, it will be seen that the several objects of the invention are achieved and other advantageous results attained.

As various changes could be made in the above apparatus without departing from the scope of the invention, it is intended that all matter contained in the above description or shown in the accompanying drawings shall be interpreted as illustrative and not in a limiting sense.

What is claimed is:

1. Apparatus for controlling the level within a vessel of a liquid having substantial cooling capacity, said vessel having valve means which, when energized varies the liquid level within said vessel, said apparatus comprising:

first and second terminals adapted to be connected to a source of electric power;

triggerable semiconductor current switching means having a power circuit connected to said terminals for switching the flow of current to said valve means and a control element for controlling the flow of current through said power circuit;

a thermistor adapted to be mounted relative to said vessel for contact with said liquid at a preselected level;

a voltage divider comprising said thermistor and a serially connected load impedance for said thermistor, said voltage divider being connected across said terminals thereby to produce controlled self-heating of said thermistor due to internal heat generation when a voltage is impressed across said terminals and said thermistor is not cooled by contact with said liquid; and circuit means, including a voltage breakdown device, connecting said control element to said divider at a junction between said thermistor and said impedance for triggering said switching means into conduction when the voltage at said junction exceeds a predetermined threshold value whereby said semiconductor switching means is switched between conducting and nonconducting states to selectively energize said valve means in response to changes in the resistance of said thermistor caused by contact of said thermistor with said liquid thereby to maintain the liquid substantially at said preselected level.

2. Apparatus as set forth in claim 1 wherein said thermistor has a negative temperature coefficient of resistance whereby when a voltage is impressed across said terminal said thermistor heats regeneratively to a temperature determined substantially by the value of said load impedance.

3. Apparatus as set forth in claim 1 wherein said valve admits liquid into said vessel when energized.

4. Apparatus as set forth in claim 1 wherein said semiconductor current switching means comprises a silicon controlled rectifier.

5. Apparatus as set forth in claim 4 wherein said voltage breakdown device comprises a four-layer diode.

6. Apparatus as set forth in claim 5 including a current-limiting resistor connected in series with said four-layer diode.

7. Apparatus as set forth in claim 4 wherein said voltage breakdown device comprises a neon glow tube.

8. Apparatus as set forth in claim 1 including a full-wave rectifier bridge having an A.C. input circuit and a D.C. output circuit, said valve means being connectable in series with said A.C. input circuit across an A.C. power source, said D.C. output circuit being connected to said first and second terminals whereby unidirectional conduction in said power circuit causes alternating current to be applied to said valve means.

9. Apparatus for controlling the level within a vessel of a liquid having substantial cooling capacity, said vessel having valve means which, when energized, admits liquid into said vessel, said apparatus comprising:

first and second terminals;

a silicon controlled rectifier, the anode-cathode circuit of which is connected across said terminals;

an NTC thermistor adapted to be mounted relative to said vessel for contact with said liquid at a preselected level;

a voltage divider comprising said thermistor and a serially connected load resistor for said thermistor, said voltage divider being connected across the anode-cathode circuit of said silicon controlled rectifier thereby to produce regenerative self-heating of said thermistor due to internal heat generation when a voltage appears across said anode-cathode circuit and said thermistor is not cooled by contact with said liquid; and circuit means, including a voltage breakdown device, connecting the gate terminal of said silicon controlled rectifier to said divider at a junction between said thermistor and said resistor for triggering said SCR into conduction when the voltage at said junction exceeds a predetermined threshold value whereby said apparatus comprises a two-terminal network adapted to be connected in series with said valve means across a source of electric power for selectively energizing said valve means to maintain the liquid level in said vessel at said preselected level.

10. Apparatus for controlling the level within a vessel of a liquid having substantial cooling capacity, said apparatus comprising:

valve means which, when energized, admits liquid into said vessel;

a silicon controlled rectifier;

circuit means for serially connecting said valve means and the anode-cathode circuit of said silicon controlled rectifier to an electric power source;

an NTC thermistor adapted to be mounted relative to said vessel for contact with said liquid at a preselected level;

a voltage divider comprising said thermistor and a serially connected load resistor for said thermistor, said voltage divider being connected across the anode-cathode circuit of said silicon controlled rectifier thereby to produce regenerative self-heating of said thermistor due to internal heat generation when a voltage appears across said anode-cathode circuit and said thermistor is not cooled by contact with said liquid; and circuit means, including a voltage breakdown device, connecting the gate terminal of said silicon controlled rectifier to said divider at a junction between said thermistor and said resistor for triggering said SCR into conduction when the voltage at said junction exceeds a predetermined threshold value whereby the silicon controlled rectifier is switched between conducting and nonconducting states to selectively energize said valve means in response to changes in the resistance of said thermistor caused by contact of said thermistor with said liquid thereby maintaining the liquid substantially at said preselected level.

References Cited

UNITED STATES PATENTS

| | | | |
|---|---|---|---|
| 3,222,578 | 12/1965 | Thiele | 137—392 X |
| 3,258,579 | 6/1966 | Dills | 317—148.5 |
| 3,294,974 | 12/1966 | Riebs | 317—148.5 |
| 3,315,098 | 4/1967 | Eckl | 317—148.5 |

WILLIAM F. O'DEA, *Primary Examiner.*

D. R. MATTHEWS, *Assistant Examiner.*